US009064000B1

(12) United States Patent (10) Patent No.: US 9,064,000 B1
Herrnstadt et al. (45) Date of Patent: Jun. 23, 2015

(54) OPERATIONS OVER NESTED RELATIONSHIPS USING OPERATORS

(75) Inventors: Ori Herrnstadt, Boston, MA (US); Jack A. Orenstein, Needham, MA (US)

(73) Assignee: FoundationDB, LLC, McLean, VA (US)

( * ) Notice: Subject to any disclaimer, the term of this patent is extended or adjusted under 35 U.S.C. 154(b) by 144 days.

(21) Appl. No.: 13/553,187

(22) Filed: Jul. 19, 2012

Related U.S. Application Data

(60) Provisional application No. 61/509,143, filed on Jul. 19, 2011.

(51) Int. Cl.
*G06F 7/00* (2006.01)
*G06F 17/30* (2006.01)

(52) U.S. Cl.
CPC .... *G06F 17/30598* (2013.01); *G06F 17/30412* (2013.01)

(58) Field of Classification Search
CPC .......... G06F 17/3005; G06F 17/30112; G06F 17/30424; G06F 17/30442; G06F 17/30477; G06F 17/929; G06F 17/30935–17/30938; G06F 17/30463; G06F 17/30466; G06F 17/30498; G06F 17/30312
USPC ......... 707/604, 713, 714, 719, 737, 741, 759, 707/770, 798, 803, 748, 752, 769, 809, 707/999.005, 999.102, 999.103, E17.056, 707/E17.009, E17.037, E17.127, 999.1
See application file for complete search history.

(56) References Cited

U.S. PATENT DOCUMENTS 5,974,407 A * 10/1999 Sacks .................................... 1/1
2009/0193006 A1* 7/2009 Herrnstadt ........................ 707/5

OTHER PUBLICATIONS

Gray et al. "Data Cube: A Relational Aggregation Operator Generalizing Group-By, Cross-Tab, and Sub-Totals" Data Minning and Knowledg Discovery 1 1997 Kluwer Academic Publishers, Manufactured in the Netherlands.*

* cited by examiner

*Primary Examiner* — Jason Liao
*Assistant Examiner* — Berhanu Mitiku
(74) *Attorney, Agent, or Firm* — David H. Judson (57) ABSTRACT

A set of operators on group-structured data enable creation of efficient execution plans. These operators are of two (2) distinct types. They operate similarly. For each row that matches an input row type, an hkey is obtained. The hkey uniquely identifies a table row within a table group. The hkey is transformed into a modified hkey associated with an output row type. Starting with a row of interest associated with the modified hkey, a table group is probed to identify one or more additional rows. As the additional rows are identified, they are written into an output stream.

20 Claims, 5 Drawing Sheets

```
create table Customer(
   cid int,
   name varchar(100),
   primary key(cid)
);

create table Order(
   oid int,
   cid int,
   order_date date,
   primary key(oid),
   foreign key(cid) references Customer(cid)
);

create table Item(
   iid int,
   oid int,
   unit_price numeric(10,2),
   quantity int,
   primary key(iid),
   foreign key(oid) references Order(oid)
);

create table Address(
   aid int,
   cid int,
   line1 varchar(100),
   line2 varchar(100),
   city varchar(100),
   state char(2),
   primary key(aid),
   foreign key(cid) references Customer(cid)
);
```

OPERATIONS OVER NESTED RELATIONSHIPS USING OPERATORS

CROSS-REFERENCE TO RELATED APPLICATION

This application is based on and claims priority to Ser. No. 61/509,143, filed Jul. 19, 2011.

COPYRIGHT RESERVATION

This application includes subject matter that is protected by copyright. All rights are reserved.

BACKGROUND OF THE INVENTION

1. Technical Field

This application relates generally to database management.

2. Background of the Related Art

Query optimization is a well-known database management system (DBMS) problem. Given a database query, typically there may be many ways (namely, execution plans) by which the system can produce the query to obtain a result. Although these plans may each produce the same result, one may be more computationally-efficient than another. A query optimizer may be used to examine the various execution plans (in particular, the algebraic expressions) for the query to select the most efficient technique. Once the query optimizer determines the best execution plan, a code generator or interpreter transforms the plan into one or more calls to a query processor, which executes the query.

The execution plan created by the optimizer is expressed as a collection of "operators." Operators in database systems define the functions that can be executed on one or more streams of incoming rows and emit a single stream of output rows. Operators are a widely accepted way to compose execution plans for queries. Typically, the collection of operators is organized into a tree in which the output from one operator provides the input to the next. To produce the desired result, the operators are applied to the data set, which typically is stored in homogeneous structures (i.e., as a collection of rows all of which are of the same type). A relational query processor in a conventional approach using operators passes streams of homogenous rows from one to another.

U.S. Pat. No. 8,150,850, commonly-owned, describes a database architecture in which data is organized using table groups. A "table group" is a set of tables from a relational database that have a given relationship. In a table group, all the data from at least one row of a "root" table together with all related rows of data from one or more "descendant" tables related thereto are associated together as a composite entity. This association may be physical, in which case the rows are stored in physical proximity to one another in a data store (e.g., in memory, or on disk), or it may be a logical or virtual association. Within the table group, there is one or more root-to-leaf paths (sometimes referred to as "branches"). The patent also described query plan operators (e.g., "horizontal," or "vertical," see FIGS. 15A and 16) that are designed to operate on table group-structured data. Those operators, however, operate by examining all the rows in a group; thus, they are not necessarily computationally-efficient.

BRIEF SUMMARY

According to the techniques disclosed herein, a set of operators on group-structured data enable creation of execution plans that are much more computationally-efficient than known techniques. These operators are of two (2) distinct types and preferably operate as follows. For each row that matches an input row type, a particular type of key, referred to herein as an hkey, is obtained. Typically, an hkey uniquely identifies a table row within a table group. The hkey is then transformed into a modified hkey associated with an output row type. The modification done to transform the hkey depends on which of the two operators is used. For a first operator, an ancestor lookup, the modification shortens the hkey to remove one or more values that identifies given tables and their field values. For the second operator, a branch lookup, the modification shortens the hkey in the same manner but also appends a table identifier of a branch. Then (for either operator), and starting with a row associated with the modified hkey, a table group is probed to identify one or more additional rows. As each additional row is identified, it is written into an output stream. The table group probed in effect may be either "above" the row associated with the modified key (an ancestor lookup), or it may be "below" the row associated with the modified key (a branch lookup). In the case of an ancestor lookup, the one or more rows written into the output stream have types matching the output row types identified by the ancestor lookup. In the case of a branch lookup, the one or more rows written into the output stream are of the output row type, or descendants of the row that matches the output row type. In either case, the row that matches the input row type is one of: a table index row, a group index row, or a table row (e.g., a row that is associated with at least one other table row in a table group).

The foregoing has outlined some of the more pertinent features of the subject matter. These features should be construed to be merely illustrative.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

As used herein, the following terms have the following meanings:

A "table" is a table of a relational database. A table may be a "parent" of another table, in which case ancestor and descendant relationships may be defined. Thus, table A is an ancestor of table B if A is the parent of B, or if A is an ancestor of the parent of B; likewise, table B is a descendant of table A if and only if A is an ancestor of B.

A "table group" is a set of tables from a relational database that have a given relationship, such as described in assignee's U.S. Pat. No. 8,150,850, the disclosure of which related to FIG. 6 through FIG. 10A there is incorporated herein by reference. In a table group, all the data from at least one row of a "root" table together with all related rows of data from one or more "descendant" tables related thereto are associated together as a composite entity. This association may be physical, in which case the rows are stored in physical proximity to one another in a data store (e.g., in memory, or on disk), or it may be a logical or virtual association. Within the table group, there are one or more root-to-leaf paths (sometimes referred to as "branches").

A "root" table in a table group is the only table therein that has no ancestor.

A "root-to-leaf path" or "branch" includes, along the root-to-leaf path, the root table, and one or more descendant tables, and wherein one of the descendant tables is a "leaf" table. All the tables along the root-to-leaf path must lie along the path.

A "leaf" table in a root-to-leaf path of a table group is the only table along that path that has no descendant.

A relational database "index" is a data structure that improves the speed of data retrieval operations on one table of the database. Typically, an index is defined on one or more columns of a database table to provide for random lookups into the table, and efficient access of ordered records identified by the index. Ordering can often obviate an expensive sort later on in query processing. Because an index's key typically contains only the fields according to which the table is to be arranged, the disk space required to store the index is less than that required by the table. This enables the index to be stored in memory even though the table itself may be too large to be stored there, leading to further performance improvements by reducing the number of disk input/output operations. Some databases allow indices to be created on functions or expressions.

A "group index" is a data structure that facilitates access to and retrieval of data from the tables that comprise a table group. In particular, a group index identifies a unique root-to-leaf path, or a portion thereof, and it has a key of columns from multiple, distinct tables in the root-to-leaf path. In particular, the key of the group index comprises fields from at least two tables contained in one root-to-leaf path of the group. The fields of the key may be in any order relative to one another. The group index also includes a value, called the hkey, associated with the key. The hkey identifies a row of the group index key's leaf-most (i.e., the deepest) table, as well as that row's ancestor rows (including whether such rows exist).

The key of a group index combines columns from tables that are contained in a branch. The branch serves to constrain what tables can contribute columns to a group index. There is no limit on the number of group indexes corresponding to a branch, a group, or in a database. A group index key associated with a branch B of a table group may be described by the following nomenclature: ($table_1$.column, $table_2$.column, ...). In this nomenclature, "table.column" identifies one of the columns of the group index. As noted above, in a group index, the non-hkey values typically come from different tables along the branch B.

A group index may represent inner or outer join semantics in relational algebra. For instance, a group join representing a two-table branch, with a parent and a child table, may represent an outer join in which all of the child table's rows are represented, along with their parent rows, or, if a child row has no corresponding parent row, a null value. In particular, the parent table columns in the index key and in the hkey would be null. A similar group index may represent an inner join, such that each value from the child row is present if, and only if, it has a corresponding parent row.

Because each hkey preferably includes information pertaining to which associated rows exist, group indexes which represent outer joins can act as if they represent inner joins by simply ignoring all entries for which parent rows do not exist, as informed by the hkey.

A "leaf-most" table in a group index is the table that is leaf-most among the tables represented by the group index key. The leaf-most table is not necessarily leaf-most in the corresponding branch. Thus, for example, if the branch is customer/order/item and a group index key is (customer.name, order.date), then the hkey identifies an order (leaf-most of customer and order), not an item (leaf-most in the branch). An hkey also identifies rows from ancestor tables (i.e. tables that are higher up in the group, or "root-ward").

A "database query" is a non-procedural specification of data to be accessed or retrieved from the relational database.

An "execution plan" executes the database query. Query execution typically relies on indexes. When the execution plan for a query is generated, it may decide to use (or not use) some index. An execution plan created by an optimizer is expressed as a collection of "operators." Operators define the functions that can be executed on or more streams of incoming rows and emit a single stream of output rows. Operators are used to compose execution plans for queries. Typically, the collection of operators is organized into a tree in which the output from one operator provides the input to the next.

A "result" is the sequence of rows resulting from execution of the execution plan. It may include, without limitation, any or all of the following: (a) data from one or more rows of the table group, (b) data from rows of one or more indexes, data derived from (a) and/or (b), and (c) values embedded in the query.

By way of additional background, an operator takes one or two streams of rows as input, and generates one stream of rows as output. For simplicity of explanation, it is assumed that there is just a single stream of rows as input. For example, a particular operator might take a stream of rows of various types, and keeps only those rows of specified types.

The rows in the output stream are a subset of the rows in the input stream. As another example, an operator might takes rows of a given type, computes functions of the row, $f_1, f_2, \ldots, f_n$, and then generate as output a row containing the results of all those functions applied to an input row. As further background, typically the database schema of the type described herein includes several kinds of rows: a table row, a table index row, and a group index row. Each of these kinds of rows is capable of providing an hkey. Each of these row types is now described.

A table row is a row from some table, e.g. a Customer table. A table row has a type indicating the table it came from. Thus, e.g., a row from the Customer table has type Customer. A table row is uniquely identified by its hkey, which also describes its position in the group to which the table belongs, and the hkey provides fast access to the row within the group. Thus, as used herein, a table row is stored in a group, possibly along with rows of other tables.

A table index row indexes fields from one table row and associates the table row's hkey value with those values. The index is organized for very efficient lookup given values of the indexed fields, which gets to the hkey. Once the hkey is known, it can be used to quickly locate the indexed row in the group. Table index rows have types too, and these types identify the index to which they belong.

A group table index is like a table index row, except that the indexed fields come from the tables along a group's branch.

Figure 1:
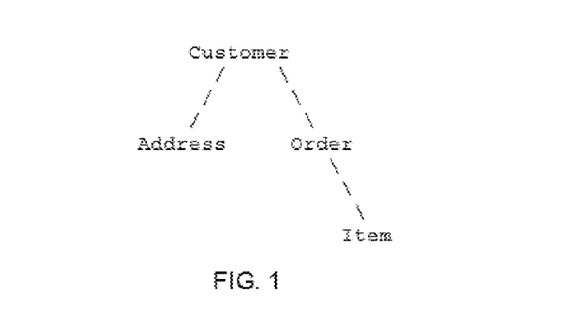
FIG. 1 is a simplified representation of an exemplary table group.
Figure 2:
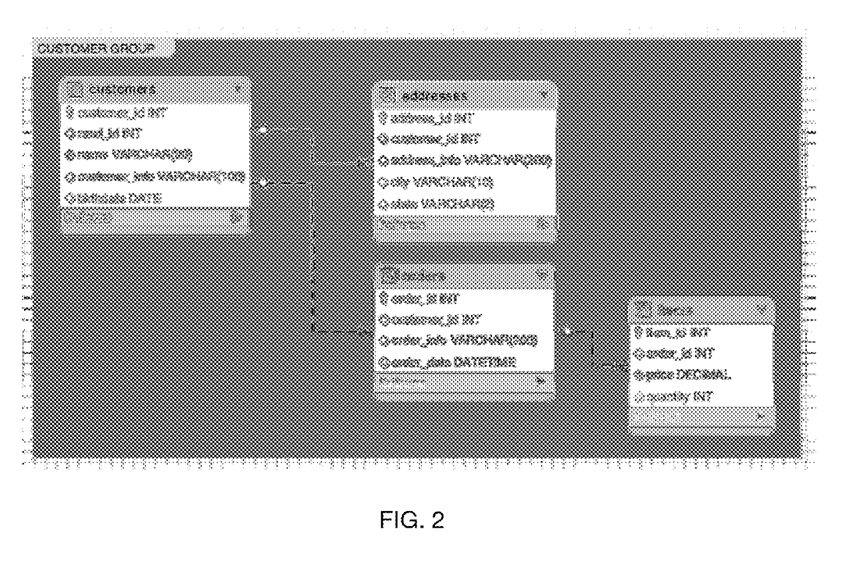
FIG. 2 is an entity relationship diagram (ERD) illustrating a relationship schema for the exemplary table group of FIG. 1.

FIG. 1 is a representative table group that illustrates these definitions. FIG. 2 illustrates the tables of the representative table group using a conventional entity relationship diagram (ERD). This figure also illustrates some of the definitions pertaining to group structure. In this example, which is not intended to be limiting, the table group comprises four (4) distinct tables, a customer table, an address table, an order table, and an item table. In this example, a customer has zero or more addresses, and the customer also has zero or more orders. An order has zero or more items associated therewith.

Figure 3:
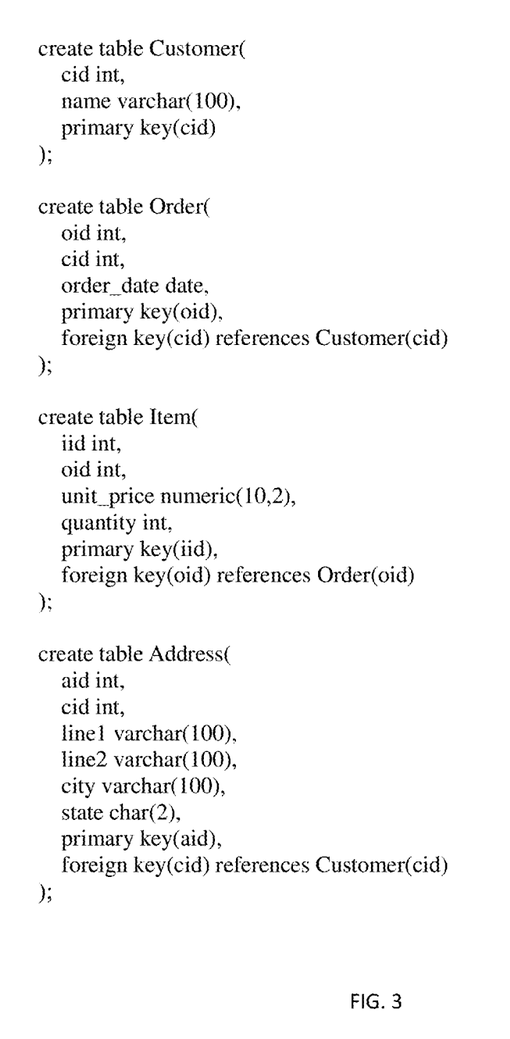
FIG. 3 is a database schema corresponding to the ERD in FIG. 2.

As FIG. 1 illustrates, a group organizes a set of user-defined tables into a hierarchy, based on selected foreign key definitions. FIG. 3 illustrates a database schema for the Customer-Order-Item-Address (COIA) example, to be used throughout the following discussion. If all of these foreign keys are used to define a group, then the group structure is as shown in FIG. 3.

The attributes from a branch's tables may be included in any order in a group index. This provides greater query processing efficiencies when attempting to locate relevant data.

The hierarchical row ids (hkeys) for each table row enable the identification of rows within their respective group of tables. Preferably, they store not only the row information, but also the information for the row's parent tables.

In the group structure, there are parent and child relationships among types. This approach is analogous to foreign key terminology: Order has a foreign key to Customer, so Order is said to be a child of Customer, and Customer is a parent of Order. In general, the set of foreign keys defining a group form a tree. In a non-group schema, the Order table might have a foreign key to Credit_card as well as a foreign key to Customer. Order therefore has two parents, one for each foreign key. In defining group structure, however, a table can have only one parent. So, in a group, the root has zero parents and zero or more children; a non-root has one parent and zero or more children.

Because parent and child relationships exist among row types, the concepts of ancestor and descendent are easy to define, preferably through repeated applications of the parent and child relationships. Thus, given the example above:

TABLE 1

Customer table-group hierarchy

| Table (Row Type) | Ancestors | Descendents |
|---|---|---|
| Customer | | Address, Order, Item |
| Address | Customer | |
| Order | Customer | Item |
| Item | Customer, Order | |

Figure 4:
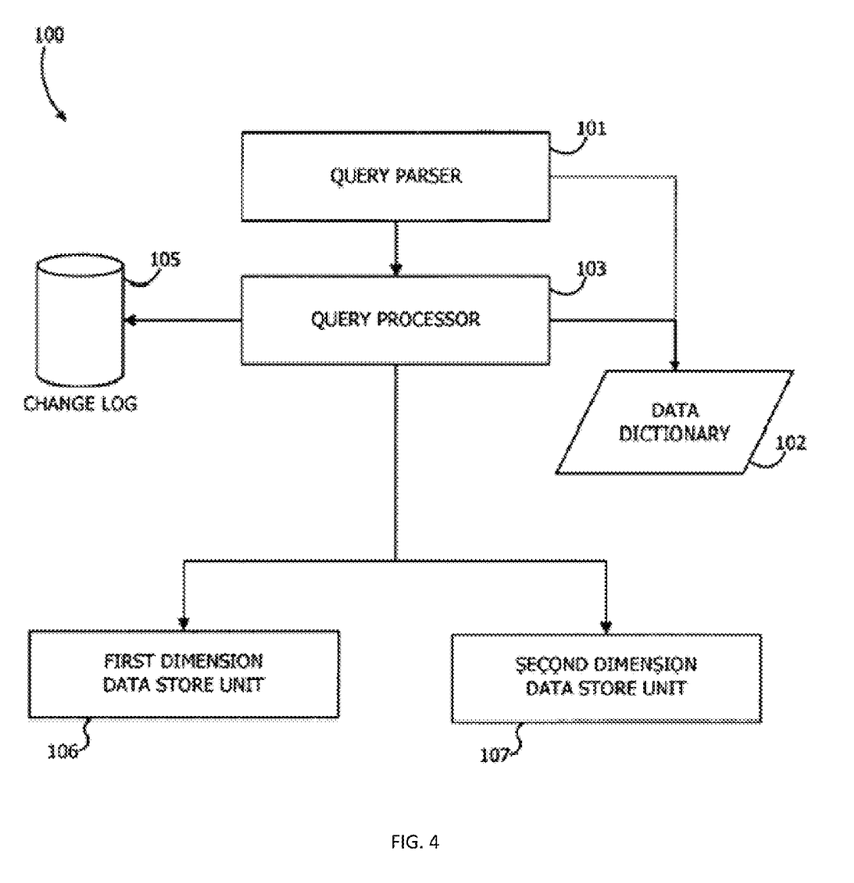
FIG. 4 is an exemplary database architecture in which the group index of the disclosure is implemented.

FIG. 4 is a functional block diagram of one implementation of a database management system 100 in which the principles of this disclosure may be practiced. The system includes, as components, a query parser 101, a data dictionary 102, a query processor 103 and a change log 105. The specific implementation of each of these system components may vary. In this embodiment, which is not intended to be limiting, the query processor 103 interacts with a first dimension data store unit 106, a second dimension data store unit 107, or both, according to a query plan that the query processor 103 develops. Each of the first and second dimension data store units 106 and 107 stores all the data, but preferably according to different storage schemata. Consequently, the architecture in FIG. 1 provides data redundancy by maintaining two copies of the data, albeit according to different storage schemata.

Generalizing, the first and second dimension data store units in FIG. 2 provide for a multi-dimensioned database architecture. This architecture is described in detail in U.S. Pat. No. 8,150,850. In that patent, a database management system includes database storage for data of a logical database model comprising at least one table group wherein each table group includes one root table and at least one other table related thereto and wherein each logical table is characterized as having columns of attributes and rows of data. Preferably, the database storage comprises the first dimension and second dimension store units, also referred to as first and second data stores. The first data store positions all the data in the database in a plurality of memory locations in a first dimension wherein each of the plurality memory locations includes all the data from one row of a root table and all the related data from the other tables in that table group relevant data that one root table row. This storage schema allows sequential access to all the data in that root table row and its related rows in the other related tables. The second data store positions all the data in the database in a plurality of memory locations in a second dimension wherein each memory location includes all the data from one of the attributes in the database and all the corresponding values thereby to allow sequential access to the data in each attribute.

In accordance with another aspect of the above-identified patent, data structures are generated for data contained in a logical database model with tables in different relationships and a data dictionary. Table groups are formed from the tables in the logical database based upon the data in the data dictionary including, for each table group, a root table and tables related thereto. A first data store unit is created for all table groups in which the data for the database is stored in a first dimension wherein each of a plurality of memory locations includes all the data from one row of the root table and relevant data from the related tables thereby to allow sequential access to all the data in that root table row and related table row. A second data store unit is created for storing the data in the database in a plurality of memory locations in a second dimension wherein each memory location includes all the data from an attribute in the database and all the corresponding values thereby to allow sequential access to the data in each attribute memory location.

In the techniques described in the above-identified patent, when tables are used to form a "table group," preferably the rows are stored together, preferably in a single primary b-tree. A table group does not require the rows of the tables to be stored in physical proximity. As noted above, the association of the rows of the tables may be logical.

Operations Over Nested Relationships Using Operators

With the above as background, the subject matter of this disclosure is now described.

As described above, operators in database system define the functions that can be executed on one or more streams of incoming rows and emit a single stream of output rows. According to this disclosure, three (3) new operators are described for use in the context of the described database schema. They include at least the following (other operators may be used as well to compute a particular query): an index scan (a "first") operator, branch lookup (a "second") operator, and ancestor lookup (a "third") operator. The ordering is not intended to place any restriction on the use of these operators, although typically the index scan is carried out before either the branch or ancestor lookup; in some cases (as described below) the branch or ancestor lookup is carried out independently of any index scan.

Generally, the "index scan" operator scans an index to locate index records whose keys are inside a given range. An index scan is a known function in a database system; in the context of this disclosure, preferably the index scan operator returns one or more hkeys. An index scan returns rows of the index, each of which has a key and value. The hkey is contained in the value part of the index row.

In particular, the index scan is given an index to work with by the query optimizer. As noted above, that index may be a group index, or it may be a table index. In either case, the index scan returns rows containing hkeys, and these hkeys are then used in branch or ancestor lookups using the respective second or third operators. Thus, branch or ancestor lookup is driven by an hkey, which can come from a group table row, a table index row, or a table row (where that row typically is associated with other table rows within the group structure). In other words, rows that are not from indexes (e.g., possibly from a previous ancestor or branch lookup) may also provide hkeys that drive ancestor or branch lookup.

The second operator, the branch lookup, preferably has two row type parameters, an input row type and an output row type, which parameters are used to determine the handling of rows from the input stream. If the input row is not of the input row type, then that row may be written to the output stream (depending on other operator parameters). The rest of the discussion assumes that there is an input row matching the input row type. The operator works as follows, with reference to the process flow in FIG. 4. At step 400, and for each input row (matching the input row type), the hkey is obtained. At step 402, the hkey is then transformed into another hkey corresponding to the branch identified by the output row type. Step 402 generates an hkey that can be used to efficiently probe the group to locate the root-most row of the branch. At step 404, the operator then scans forward in the group until all descendant rows are located. At step 406, the rows located in this way are written to the output stream. In particular, as each row is identified, it is written into the output stream. As can be seen, the branch lookup does not depend on the kind of row, namely, table row, table index row, or group index row, as each of these provides an hkey and is therefore useful as input.

In simple execution plans, it is usually the case that a table index row or group index row feeds into the branch lookup. In more complex queries, and in groups with several branches, it is also possible to have the first branch lookup driven by a table index row or group index row, and then to drive lookups of other branches by table rows that came out of earlier branch lookups. (Branch lookup input rows can be table index rows, group index rows or table rows. Branch lookup output, however, is always a table row.)

Figure 5:
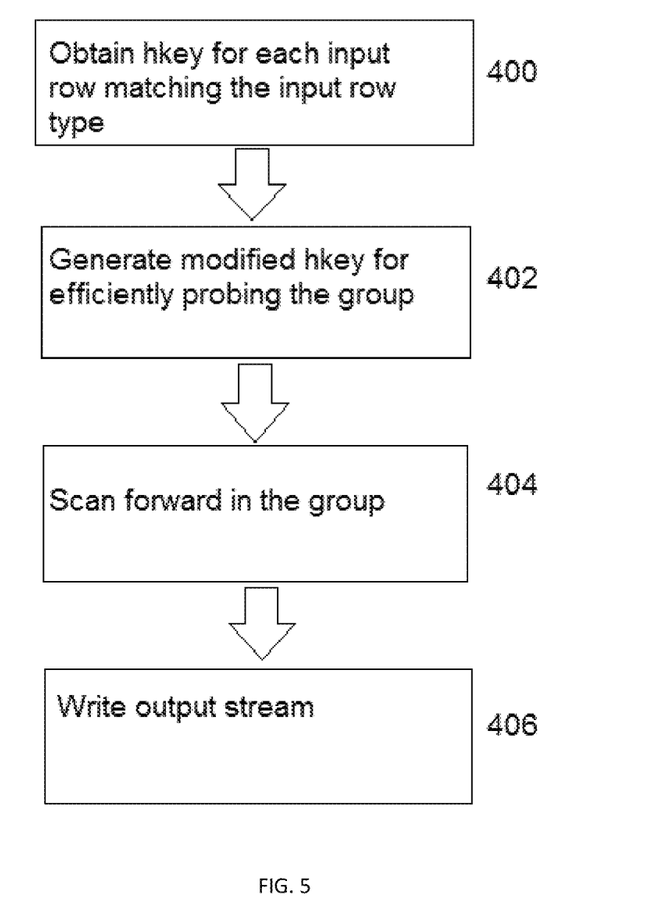
FIG. 5 illustrates a process flow of a branch lookup operator of this disclosure.
Figure 6:
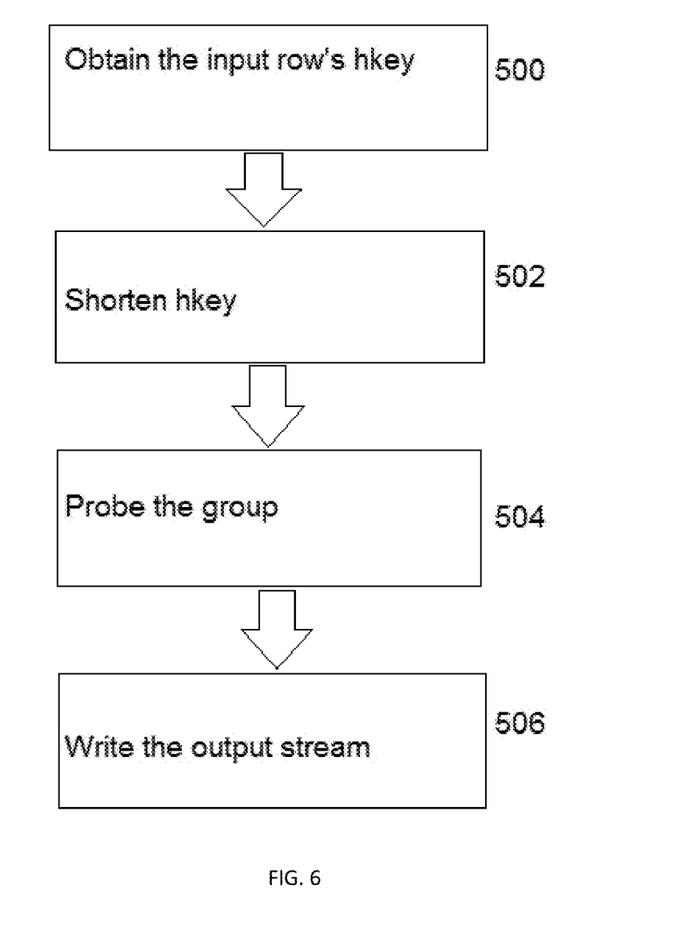
FIG. 6 illustrates a process flow of an ancestor lookup operator of this disclosure.

The third operator, ancestor lookup, is similar to branch lookup, except for the handling of the hkey from the input row. One parameter to ancestor lookup is a set of ancestor types. After obtaining the hkey from the input row, the hkey is shortened as necessary to be able to read a row of each requested ancestor type (an output type). The ancestor lookup operator operates on streams of rows. As noted above, these rows are often provided by an index scan, but this is not a requirement, as the rows can also come from other operators as well. For each input row of a specified input type, the ancestor lookup is used to locate ancestors of specified output types in the following manner and as described in the process flow in FIG. 5: obtain the input row's hkey (step 500), shorten it as required for each output type (step 502), and then probe the group to locate the associated table row (step 504). At step 506, the one or more table rows retrieved are written to the operator's output stream. As before, the rows are written into the output stream as they are identified.

The nomenclature of "index scan," "ancestor lookup" and "branch lookup" is merely for exemplary purposes and should not be considered limiting. As noted above, these operators may just be considered "first," "second" and "third" operators. The index scan (or "first") operator provides a starting point (e.g., a hkey), from which either the branch (or "second") operator or the ancestor (or "third") operator then provides the results of the relevant join(s) of interest. The approach provide an index-like lookup that enables the execution plan to begin at the one or more hkeys instead of having to operate over all the rows in a group.

The following examples illustrate the process.

With reference to FIG. 1, assume that a table index exists on order.order_date. If a first query is "find the names of customers who placed an order in October, 2008," that query is represented by the following SQL query:

SELECT c.name
FROM customer c, order o
WHERE c.cid=o.cid
　　AND o.order_date between '2008-10-01' and '2008-10-31'

Using the approach described herein, an execution plan for this query may then be to first do an index scan on the order-.order_date index, for orders in the range 2008-10-01 through 2008-10-31; feed the resulting order hkeys into an ancestor lookup operator to locate the qualifying customers. Ancestor lookup shortens the order hkey to a customer hkey, and then retrieves the identified customer. From these customers, the customer name is retrieved.

Another example query might be "find the sum of unit_price*quantity for all orders placed in October, 2008. The representative SQL is:

SELECT sum(unit_price*quantity)
FROM order o, item I
WHERE o.oid=i.oid
　　AND o.order_date between '2008-10-01' and '2008-10-31'

An execution plan for this query may then be to first do an index scan on the order.order_date index, for orders in the range 2008-10-01 through 2008-10-31; feed the resulting order hkeys into a branch lookup operator to locate the items of interest. Also, the branch lookup operator appends to the order hkey an identifier of the item table, which causes the resulting hkey to identify the first item of the orders items. Branch lookup then uses this to scan the order's items. In this example, the unit_price*quantity is computed for each item and these values are accumulated.

The following section provides additional technical details regarding a reference implementation of the operators described herein.

1 Operators

With the above as background, the following section documents the behavior and performance of a set of physical operators of the OA and the associated algebra. There is one subsection for each operator, providing the following information:

Overview: a brief description of what the operator does;
　Arguments: the arguments to the constructor;
　Behavior: a description of the operator's behavior.

1.1 Index Scan

Overview

IndexScan_Default scans an index to locate index records whose keys are inside a given range.

Arguments

IndexRowType indexType: The index's type.
　boolean reverse: Indicates whether keys should be visited in ascending order (reverse=false) or descending order (reverse=true).
　IndexKeyRange indexKeyRange: Describes the range of keys to be visited. The values specified by the indexKey-Range should restrict one or more of the leading fields of the index. If null, then the entire index will be scanned.

Behavior

If reverse=false, then the index is probed using the low end of the indexKeyRange. Index records are written to the output stream as long as they fall inside the indexKeyRange. When the first record outside the indexKeyRange is located, the scan is closed.

If reverse=true, the initial probe is with the high end of the indexKeyRange, and records are visited in descending key order.

1.2 Ancestor Lookup

Overview

AncestorLookup_Default locates ancestors of both group rows and index rows. One expected usage is to locate the group row corresponding to an index row. For example, an index on customer.name yields index rows which AncestorLookup_Default can then use to locate customer rows. (The ancestor relationship is reflexive, e.g. customer is considered to be an ancestor of customer.)

Another expected usage is to locate ancestors higher in the group. For example, given either an item row or an item index row, AncestorLookup_Default can be used to find the corresponding order and customer.

Unlike BranchLookup, AncestorLookup always locates 0-1 row per ancestor type.

Arguments

GroupTable groupTable: The group table containing the ancestors of interest.

RowType rowType: Ancestors will be located for input rows of this type.

List<RowType> ancestorTypes: Ancestor types to be located.

boolean keepInput: Indicates whether rows of type rowType will be preserved in the output stream (keepInput=true), or discarded (keepInput=false).

rowType may be an index row type or a group row type. For a group row type, rowType must not be one of the ancestorTypes. For an index row type, rowType may be one of the ancestorTypes, and keepInput must be false (this may be relaxed in the future). The groupTable, rowType, and all ancestorTypes must belong to the same group.

Each ancestorType must be an ancestor of the rowType (or, if rowType is an index type, then an ancestor of the index's table's type).

Behavior

For each input row, the hkey is obtained. For each ancestor type, the hkey is shortened if necessary, and the groupTable is then search for a record with that exact hkey. All the retrieved records are written to the output stream in hkey order (ancestors before descendents), as is the input row if keepInput is true.

1.3 Branch Lookup

Overview

Given an index row or group row, BranchLookup_Default locates a related branch, i.e., a related row and all of its descendents.

Unlike AncestorLookup, BranchLookup always retrieves a subtree under a targeted row.

Arguments

GroupTable groupTable: The group table containing the ancestors of interest.

RowType inputRowType: Branches will be located for input rows of this type.

RowType outputRowType: Type at the root of the branch to be retrieved.

boolean keepInput: Indicates whether rows of type inputRowType will be preserved in the output stream (keepInput=true), or discarded (keepInput=false).

Limit limit (optional): A limit on the number of rows to be returned. The limit is specific to one UserTable.

inputRowType may be an index row type or a group row type. For a group row type, inputRowType must not match outputRowType. For an index row type, rowType may match outputRowType, and keepinput must be false (this may be relaxed in the future).

The groupTable, inputRowType, and outputRowType must belong to the same group. If inputRowType is a table type, then inputRowType and outputRowType must be related in one of the following ways:

outputRowType is an ancestor of inputRowType.

outputRowType and inputRowType have a common ancestor, and outputRowType is a child of that common ancestor.

If inputRowType is an index type, the above rules apply to the index's table's type.

Behavior

For each input row, the hkey is obtained. The hkey is transformed to yield an hkey that will locate the corresponding row of the output row type. Then the entire subtree under that hkey is retrieved. Orphan rows will be retrieved, even if there is no row of the outputRowType.

All the retrieved records are written to the output stream in hkey order (ancestors before descendents), as is the input row if keepinput is true.

The techniques described herein are implemented within a database management system or apparatus. This apparatus may be specially constructed for the required purposes, or it may comprise a computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A computer-readable medium having instructions stored thereon to perform the operator declaration and use functions is tangible.

A given implementation of each operator is software written in a given programming language that runs on a server (also typically implemented as software) on some hardware platform (more generally, at least one hardware element) running an operating system. As noted above, the techniques may be implemented as well as a virtual machine or appliance, or in any other tangible manner.

The operators as defined herein may be implemented as a single functional module, or by one or more distinct functional modules.

A particular implementation is as a query optimizer.

In an alternative embodiment, the subject techniques are implemented in a machine, appliance, system, device, program or process ancillary to a query optimizer.

The techniques also may be implemented in (or in association with) a code generator or an interpreter that transforms the execution plan into one or more calls to a query processor, which executes the query.

In the alternative, the techniques may be implemented in a query processor.

A particular execution plan may use an ancestor lookup, or it may use a branch lookup, or it may use both style lookups.

Having described our invention, what we now claim is as follows.

The invention claimed is:

1. A computer program product in a non-transitory computer readable medium, the computer program product comprising machine-readable program instructions executed by a processor to perform a method of storage and retrieval with respect to a set of data stored in tables organized by table groups, wherein a table group comprises all the data from at least one row of a root table together with all related rows of data from one or more other tables related thereto such that rows from multiple distinct tables of the table group are associated as a composite entity, wherein, within the table group, there are one or more root-to-leaf paths that each include, along the root-to-leaf path, the root table, and one or more descendant tables, wherein one of the descendant tables is a leaf table, the method comprising:

in response to receipt of a query, constructing a plan of execution composed of one or more operators, wherein at least one of the operators identifies a table or index to be used as an input row type;

carrying out the plan of execution by:

for each row that matches the input row type, obtain an hkey;

transforming the hkey into a modified hkey associated with an output row type pointing to a different table or index;

starting with a row of interest associated with the modified hkey, probing a table group to read one or more additional rows; and         as each of the one or more additional rows are read, writing into an output stream the one or more additional rows, the output stream being a response to the query.

2. The computer program product as described in claim 1 wherein the row that matches the input row type is one of: a table index row, a group index row, and a table row.

3. The computer program product as described in claim 1 wherein the modified hkey is created by shortening the hkey into a shortened hkey that points to the row of interest.

4. The computer program product as described in claim 3 further including appending a table identifier to the shortened hkey.

5. The computer program product as described in claim 3 wherein probing the table group returns one or more additional rows that have given output row types matching the output row type associated with the modified hkey.

6. The computer program product as described in claim 4 wherein probing the table group returns one or more additional rows that are descendants of the row that matches the input row type.

7. The computer program product as described in claim 1 wherein the hkey uniquely identifies a table row within the table group.

8. The computer program product as described in claim 1 wherein the query is a non-procedural specification of data to be retrieved.

9. The computer program product as described in claim 1 wherein at least one row of a root table together with all related rows of data from one or more descendant tables related thereto are stored together physically.

10. A method of retrieving data stored in tables organized by table groups, wherein a table group comprises all the data from at least one row of a root table together with all related rows of data from one or more other tables related thereto such that rows from multiple distinct tables of the table group are associated as a composite entity, wherein, within the table group, there are one or more root-to-leaf paths that each include, along the root-to-leaf path, the root table, and one or more descendant tables, wherein one of the descendant tables is a leaf table, the method comprising:

in response to a database query, the database query being a non-procedural specification of data to be retrieved, generating an execution plan composed of one or more operators, wherein at least one of the operators identifies a table or index to be used as an input row type;

carrying out the execution plan by the following sub-steps, using a hardware element:

for each row that matches the input row type, obtaining an hkey;

transforming the hkey into a modified hkey associated with an output row type pointing to a different table or index;

starting with a row of interest associated with the modified hkey, probing a table group to read one or more additional rows; and         as each of the one or more additional rows are read, writing into an output stream the one or more additional rows, the output stream being a response to the query.

11. The method as described in claim 10 wherein the row that matches the input row type is one of: a table index row, a group index row, and a table row.

12. The method as described in claim 10 wherein the modified hkey is created by shortening the hkey into a shortened hkey that points to the row of interest.

13. The method as described in claim 12 further including appending a table identifier to the shortened hkey.

14. The method as described in claim 12 wherein probing the table group returns one or more additional rows that have given output row types matching the output row type associated with the modified hkey.

15. The method as described in claim 13 wherein probing the table group returns one or more additional rows that are descendants of the row that matches the input row type.

16. The method as described in claim 10 wherein the hkey uniquely identifies a table row within the table group.

17. Apparatus, comprising:

a relational database in which data is stored in tables organized into table groups, wherein a table group comprises all the data from at least one row of a root table together with all related rows of data from one or more other tables related thereto such that rows from multiple distinct tables of the table group are associated as a composite entity, wherein, within the table group, there are one or more root-to-leaf paths that each include, along the root-to-leaf path, the root table, and one or more descendant tables, wherein one of the descendant tables is a leaf table;

computer memory storing program code that is responsive to a database query to generate an execution plan composed of one or more operators, wherein at least one of the operators identifies a table or index to be used as an input row type;

computer memory storing program code to carry out the execution plan by the following sub-steps:

for each row that matches the input row type, obtaining an hkey;

transforming the hkey into a modified hkey associated with an output row type pointing to a different table or index;

starting with a row of interest associated with the modified hkey, probing a table group to read one or more additional rows; and         as the one or more additional rows are read, writing into an output stream the one or more additional rows, the output stream being a response to the query.

18. The apparatus as described in claim 17 wherein the row that matches the input row type is one of: a table index row, a group index row, and a table row.

19. The apparatus as described in claim 17 wherein probing the table group returns one or more additional rows that have given output row types matching the output row type associated with the modified hkey.

20. The apparatus as described in claim 17 wherein probing the table group returns one or more additional rows that are descendants of the row that matches the input row type.

\* \* \* \* \*